(12) United States Patent　(10) Patent No.: US 12,403,630 B2
Ooka et al.　(45) Date of Patent: Sep. 2, 2025

(54) EXTRUDER, DEHYDRATION CYLINDER, DEHYDRATING METHOD AND MANUFACTURING METHOD OF RESIN PELLET

(71) Applicant: THE JAPAN STEEL WORKS, LTD., Tokyo (JP)

(72) Inventors: Yusuke Ooka, Tokyo (JP); Hiroshi Uneda, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/736,058

(22) Filed: May 3, 2022

(65) Prior Publication Data

US 2022/0355511 A1　Nov. 10, 2022

(30) Foreign Application Priority Data

May 6, 2021　(JP) ................................. 2021-078339

(51) Int. Cl.
*B29B 9/16*　(2006.01)
*B29B 9/06*　(2006.01)

(52) U.S. Cl.
CPC ................. *B29B 9/16* (2013.01); *B29B 9/06* (2013.01); *B29B 9/065* (2013.01); *B29B 2009/168* (2013.01)

(58) Field of Classification Search
CPC ..... B29C 48/761; B29C 48/40; B29C 48/766; B29C 48/0022; B29C 48/68; B29C 48/681; B29C 48/682; B29C 48/767; B29C 48/685; B29C 48/763; B29C 48/29; B29B 9/16; B29B 9/06; B29B 7/489; B29B 7/726; B29B 7/842; B29B 9/065; B29B 13/06; B29B 7/483; B29B 7/90; B29B 2009/168; B29B 2013/002; B29B 2013/005;

(Continued)

(56) References Cited

U.S. PATENT DOCUMENTS 3,684,252 A * 8/1972 Nissle ................... B29C 48/762
　　　　　　　　　　　　　　　　　　　422/255
4,448,537 A * 5/1984 Sugimori ............... B01D 29/46
　　　　　　　　　　　　　　　　　　　366/144

(Continued)

FOREIGN PATENT DOCUMENTS

CN　　106182691 A　*　12/2016　............. B08B 17/00
JP　　2001-129870 A　　5/2001

OTHER PUBLICATIONS

CN106182691A Shi Espacenet Machine Translation (Year: 2024).*

*Primary Examiner* — Seyed Masoud Malekzadeh
(74) *Attorney, Agent, or Firm* — Potomac Law Group, PLLC

(57) ABSTRACT

An extruder includes a cylinder, a screw built in the cylinder, a dehydration cylinder block provided in the middle of the cylinder and discharging moisture that is separated from a resin material supplied into the cylinder. The dehydration cylinder block has a structure in which plate-shaped members each having an opening are arranged in a long-axis direction of the cylinder, a screw passing through the opening. Surface roughness of mutually opposing surfaces of the plurality of plate-shaped members is rougher than surface roughness of an inner wall of the cylinder.

4 Claims, 11 Drawing Sheets

(58) Field of Classification Search
CPC ........... B29B 7/84; B29B 9/168; B29B 7/482;
B28B 3/269; C08C 3/00; Y10S 425/812
USPC ....................................................... 425/203
See application file for complete search history.

(56) References Cited

U.S. PATENT DOCUMENTS

| | | | |
|---|---|---|---|
| 2006/0188599 A1* | 8/2006 | Gorman | A44B 18/0061 |
| | | | 425/327 |
| 2015/0158228 A1* | 6/2015 | Scholtens | B29C 48/02 |
| | | | 425/377 |
| 2015/0247011 A1* | 9/2015 | Nomura | C08J 3/226 |
| | | | 524/575.5 |
| 2020/0032003 A1* | 1/2020 | Ariura | B29B 11/10 |

* cited by examiner

EXTRUDER, DEHYDRATION CYLINDER, DEHYDRATING METHOD AND MANUFACTURING METHOD OF RESIN PELLET

CROSS-REFERENCE TO RELATED APPLICATION

The present application claims priority from Japanese Patent Application No. 2021-078339 filed on May 6, 2021, the content of which is hereby incorporated by reference into this application.

TECHNICAL FIELD OF THE INVENTION

The present invention relates to an extruder, a dehydration cylinder, a dehydrating method, and a manufacturing method of a resin pellet.

BACKGROUND OF THE INVENTION

For example, Patent Document 1 (Japanese Patent Application Laid-open No. 2001-129870) discloses a technique about an extruder.

SUMMARY OF THE INVENTION

Resin products such as resin pellets can be manufactured by using a resin material(s) that is extruded from the extruder. When the resin products are manufactured by using the extruder, the resin material is supplied into a cylinder of the extruder, is kneaded and conveyed by a screw built in the cylinder, and is extruded from a die that is attached to a tip portion of the cylinder.

The resin material supplied to the cylinder may contain a high proportion of moisture, but if a water content of the resin material extruded from the extruder is high, it becomes difficult to manufacture resin products such as resin pellets by using the resin material extruded from the extruder. In that case, it is desirable to provide a dehydration cylinder in the middle of the cylinder of the extruder so that moisture separated from the resin material conveyed into the cylinder is discharged from the dehydration cylinder.

However, when the moisture is discharged from the dehydration cylinder, not only the moisture but also a resin component(s) may be discharged from the dehydration cylinder together, which may cause a problem. For this reason, it is desired to selectively discharge the moisture contained in the resin material from the dehydration cylinder and prevent the resin component from being discharged.

Other problems and novel features will become apparent from the description and accompanying drawings herein.

According to one embodiment, an extruder includes a cylinder, a screw built in the cylinder, and a dehydration cylinder portion discharging moisture that is separated from a resin material supplied into the cylinder. The dehydration cylinder portion has a structure in which a plurality of plate-shaped members having opening are arranged in a long-axis direction of the cylinder, the screw passing through each of the opening. Surface roughness of mutually opposing surfaces of the plurality of plate-shaped members is rougher than surface roughness of an inner wall of the cylinder.

According to one embodiment, a dehydrating method includes: (a) supplying a resin material containing moisture into a cylinder; (b) conveying the resin material by a screw in the cylinder; (c) discharging the moisture, which is separated from the resin material, from a dehydration cylinder portion provided in the middle of the cylinder; and (d) extruding the resin material from a die connected at a tip portion of the cylinder. The dehydration cylinder portion has a structure in which a plurality of plate-shaped members each having an opening are arranged in a long-axis direction of the cylinder, the screw passing through the opening. Surface roughness of mutually opposing surfaces of the plurality of plate-shaped members is rougher than surface roughness of an inner wall of the cylinder.

According to one embodiment, the moisture contained in the resin material can be discharged from the dehydration cylinder, and discharging the resin material from the dehydration cylinder can be suppressed or prevented.

DESCRIPTION OF THE PREFERRED EMBODIMENTS

Figure 1:
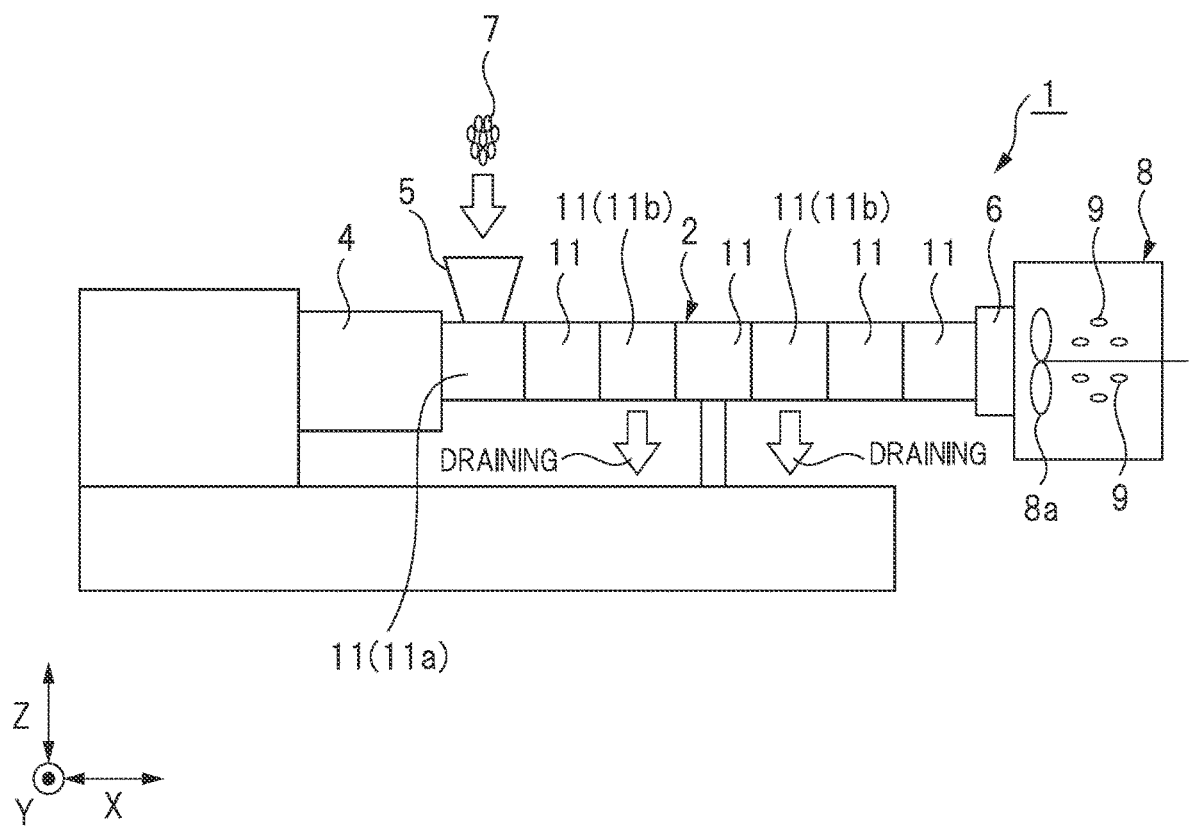
FIG. 1 is an explanatory diagram showing a configuration example of an extruder according to an embodiment.

Hereinafter, embodiments will be described in detail with reference to the drawings. Incidentally, through all the drawings for explaining the embodiments, members having the same function are denoted by the same reference numerals, and a repetitive description thereof will be omitted. Further, in the following embodiments, the same or similar parts will not be repeated in principle unless they are particularly necessary.

Embodiment

<Extruder>

Figure 2:
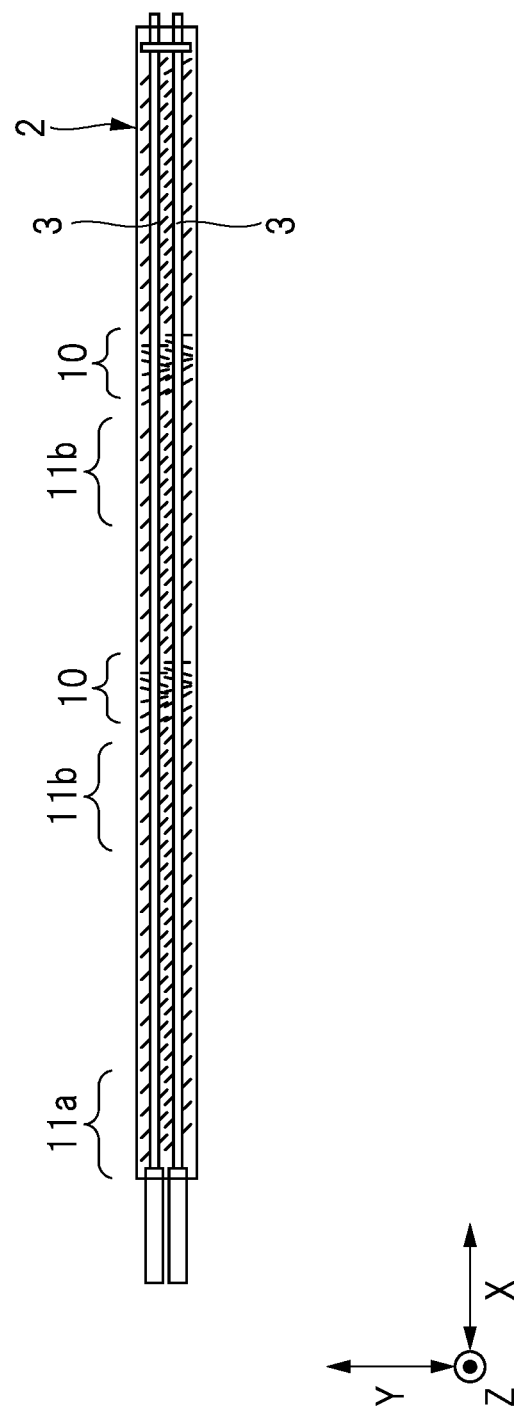
FIG. 2 is an explanatory diagram schematically showing a structure inside a cylinder of the extruder of FIG. 1.

FIG. 1 is an explanatory drawing (side view) showing a configuration example of an extruder (extruding machine) 1 of the present embodiment. FIG. 2 is an explanatory diagram (planar perspective view) schematically showing a structure inside a cylinder 2 of the extruder 1. FIG. 2 shows screws 3 arranged in the cylinder 2 in a perspective manner when the extruder 1 shown in FIG. 1 is viewed from above.

First, a schematic configuration of the extruder 1 will be described with reference to FIG. 1. The extruder 1 shown in FIG. 1 includes a cylinder (barrel) 2, two screws 3 rotatably arranged in the cylinder 2, a rotary drive mechanism 4 for rotating the screws 3 in the cylinder 2, a hopper (material charging unit, material supplying unit) 5 arranged on an upstream side of the cylinder 2, and a die (dice, mold) 6 attached to a downstream-side tip of the cylinder 2. The hopper 5 is connected to an upper surface of the cylinder 2 so that a resin material (raw material, water-containing polymer) 7 can be supplied into the cylinder 2 via the hopper 5.

Incidentally, when a "downstream side" and an "upstream side" are referred to about the cylinder 2 and the screw 3, the "downstream side" means a downstream side of a flow of a resin material in the cylinder 2, and the "upstream side" means an upstream side of the flow of the resin material in the cylinder 2. Consequently, in the cylinder 2 and the screw 3, a side closer to a tip of the cylinder 2 is the downstream side, and a side far from the tip of the cylinder 2 is the upstream side. Incidentally, the tip of the cylinder 2 corresponds to an end portion of the cylinder 2 on a side from which the resin material is extruded, that is, an end portion on a side to which the die 6 is connected.

The two screws 3 are rotatably inserted and built in the cylinder 2. Consequently, the extruder 1 can also be regarded as a twin-screw extruder. In the cylinder 2, the two screws 3 are arranged so as to mesh with each other and rotate. A long-axis direction of the cylinder 2 and a long-axis direction of the screw 3 in the cylinder 2 are the same and, here, the direction is an X direction. Incidentally, the long-axis direction of the cylinder 2 is a long-side direction or a longitudinal direction of the cylinder 2, and the cylindrical cylinder 2 extends in the X direction which is the long-axis direction of the cylinder 2. Further, the long-axis direction of the screw 3 corresponds to an axial direction of a rotation axis of the screw 3. In the cylinder 2, the resin material is conveyed from the upstream side to the downstream side in the X direction, which is the long-axis direction, by the rotating screw 3.

Further, in each drawing, an X direction, a Y direction and a Z direction are shown as necessary. The X, Y, and Z directions are directions intersecting with each other and, more specifically, are directions orthogonal to each other. Consequently, the X direction and the Y direction are orthogonal to each other, and the Z direction is orthogonal to the X direction and the Y direction. The X direction and the Y direction correspond to a horizontal direction, and the Z direction corresponds to an up-and-down direction (height direction). The X direction is the long-axis direction of the cylinder 2 and, therefore, is also the long-axis direction of the screw 3 in the cylinder 2.

Further, in the present embodiment, a case where the number of screws 3 in the cylinder 2 is two is described, but, as another embodiment, the number of screws 3 in the cylinder 2 may be one. However, when the number of screws 3 in the cylinder 2 is two, a large space volume can be obtained, so that, in a case of the same screw diameter, where the number of screws 3 is two can enhance supply capacity of the resin material more than where the number of screws 3 is one.

The cylinder 2 is composed of a plurality of cylinder blocks (cylinder portions) 11, and the plurality of cylinder blocks 11 are arranged and coupled in a direction (here, the X direction) from the upstream side to the downstream side.

The cylinder block 11a, to which the hopper 5 is connected, among the plurality of cylinder blocks 11 constituting the cylinder 2 has an opening on an upper surface thereof, and the hopper 5 is connected so as to communicate with the opening. Consequently, the resin material 7 charged into the hopper 5 is supplied into the cylinder block 11a from the opening on the upper surface of the cylinder block 11a to which the hopper 5 is connected.

Further, the plurality of cylinder blocks 11 constituting the cylinder 2 include dehydration cylinder blocks (dehydration cylinders) 11b. The dehydration cylinder block 11b is provided in the middle of the cylinder 2. That is, the dehydration cylinder blocks 11b are arranged in the middle of the plurality of cylinder blocks 11 that are arranged in a direction from the upstream side to the downstream side. In the cylinder 2, the dehydration cylinder block 11b is arranged on the downstream side of the cylinder block 11a to which the hopper 5 is connected. The dehydration cylinder block 11b can function as a discharge unit for discharging moisture, which is separated from the resin material 7 supplied into the cylinder 2, outside the cylinder 2.

FIG. 1 shows a case where the number of dehydration cylinder blocks 11b that the extruder 1 has is two, the cylinder blocks 11b being arranged at two locations in the middle of the cylinder 2. However, the number of dehydration cylinder blocks 11b that the extruder 1 has may be changed as needed, and may be any number of 1 or more.

Next, an outline of an operation of the extruder 1 shown in FIG. 1 will be described.

A resin material 7 containing moisture (water) is supplied from the hopper 5 into the cylinder 2. The resin material 7 supplied to the cylinder 2 contains moisture and a resin component (solid content). The resin material supplied from the hopper 5 into the cylinder 2 is conveyed forward (on the downstream side) in the cylinder 2 by the rotating screw 3. At this time, the resin material can be kneaded by the rotating screw 3. While the resin material is being conveyed in the cylinder 2, moisture is separated from the resin material and the separated moisture is discharged outside from the dehydration cylinder block 11b. The resin material (resin material having a reduced water content) conveyed in the cylinder 2 and reaching the tip of the cylinder 2 is discharged from a discharge port of the die 6. Since the moisture contained in the resin material is discharged outside from the dehydration cylinder block 11b, the water content of the resin material discharged from the discharge port of the die 6 is lower than the water content of the resin material 7 at a stage of being supplied from the hopper 5 into the cylinder 2. A front surface of the die 6, that is, a surface opposite to a side that is connected to the cylinder 2 is connected to a pelletizer 8. The resin material discharged from the discharge port of the die 6 is cut one after another by a cutter (cutting blade) 8a that the pelletizer 8 has, and is cooled and solidified. Consequently, pellets 9 are formed as resin pellets. Thereafter, the pellet 9 is conveyed outside the pelletizer 8, for example, to a dryer. In this way, the pellets 9 can be obtained by using the extruder 1 of the present embodiment. Kneading the pellets 9 with, for example, a functional filler or the like as a secondary raw material makes it possible to obtain a functional pellet with added value. Various resin products are manufactured by using these functional pellets.

As shown in FIG. 2, the cylinder 2 of the extruder 1 and the screw 3 in the cylinder 2 have the X direction as a long-axis direction. The screw 3 can be configured by combining, as necessary, a screw portion rotating so as to send forth a conveyed object forward at a first speed, a screw portion rotating so as to send forth the conveyed object forward at a speed lower than the first speed, and a screw portion rotating so as to push back the conveyed object backward, and a screw portion arranged so as to prevent the conveyed object from being conveyed forward. Since the screw 3 is configured by combining the various types of screw portions described above, it has such a structure that a part of the cylinder 2 (pressurizing portion 10) pressurizes the conveyed object.

The dehydration cylinder block 11b is arranged on the upstream side of the pressurizing portion 10. In the resin material conveyed in the cylinder 2, the moisture in the resin material and the resin component are separated by the pressurizing portion 10, the resin component is extruded to the downstream side of the pressurizing portion 10, and the moisture is discharged outside the cylinder 2 from the dehydration cylinder block 11b.

In the example shown in FIG. 2, the pressurizing portion 10 and the dehydration cylinder block 11b are provided at two locations in the X direction, respectively. However, most of the moisture contained in the resin material 7 supplied from the hopper 5 into the cylinder 2 shown in FIG. 1 is discharged outside the cylinder 2 from the first dehydration cylinder block 11b.

Consequently, a process for manufacturing the pellets 9 by using the extruder 1 includes: a step of supplying the resin material (7) containing the moisture into the cylinder 2; a step of conveying the resin material by the screw 4 in the cylinder 2; a step of discharging the moisture, which is separated from the resin material, from the dehydration cylinder portion 11b provided in the middle of the cylinder 2; and a step of extruding the resin material from a die 6 connected to the tip portion of the cylinder 2. The process of manufacturing the pellet 9 by using the extruder 1 further includes a step of cutting the resin material extruded from the die 6 to form the pellet 9.

<Background of Examination>

The resin material supplied to the cylinder of the extruder may contain a high proportion of moisture, but if the water content of the resin material extruded from the extruder is high, it becomes difficult to manufacture resin products such as resin pellets by using the material extruded from the extruder. For this reason, when the water content of the resin material supplied to the cylinder of the extruder is high, it is desirable to provide a dehydration cylinder (corresponding to the dehydration cylinder block 11b) in the middle of the cylinder of the extruder, separate the moisture from the resin material conveyed in the cylinder, and discharge the separated moisture from its dehydration cylinder.

For example, production of polymer such as rubber polymer is generally carried out by emulsion polymerization, solution polymerization, or the like. However, in these final stages, the polymer becomes a slurry(s) containing moisture. Flocculant is charged into the slurry to atomize, as a certain level of lump, fine particles dispersed in the slurry, and aggregated particles and liquid are then separated. The aggregated particles (polymer aggregates, hydrous crumbs) can be used as a resin material (corresponding to the resin material 7) charged into the hopper of the extruder. In this case, the particles used as the resin material that is charged into the hopper contain moisture and a resin component(s), and the water content becomes high to some extent. As an example, the resin material at a stage of being charged into the hopper contains, for example, about 30 to 50% of moisture. Meanwhile, the water content of the resin material extruded from the extruder is preferably less than 1%, for example. Incidentally, the water content is expressed in percent by weight.

For this reason, when the dehydration cylinder block is provided in the cylinder of the extruder, it is desired that the dehydration cylinder block can efficiently discharge the moisture contained in the resin material.

However, in dehydrating with the dehydration cylinder block, not only the moisture but also the resin components may be together discharged outside the dehydration cylinder block. If the resin components are also discharged from the dehydration cylinder block, a ratio of the resin components extruded from the extruder among the resin components contained in the resin material supplied to the cylinder of the extruder leads to decreasing. This may bring an increase in manufacturing cost of resin products such as resin pellets. Further, if the resin components are also discharged from the dehydration cylinder block, the resin components may accumulate and clog in a moisture discharge path of the hydration cylinder block. For preventing this, the dehydration cylinder block needs to frequently be cleaned. This brings a reduction in an operating rate of the extruder.

For this reason, when the dehydration cylinder block is provided in the cylinder of the extruder, it is desirable that the moisture contained in the resin material can be selectively discharged in the dehydration cylinder block and, simultaneously, the discharge of the resin components is suppressed.

<Dehydration Cylinder Block>

Figure 3:
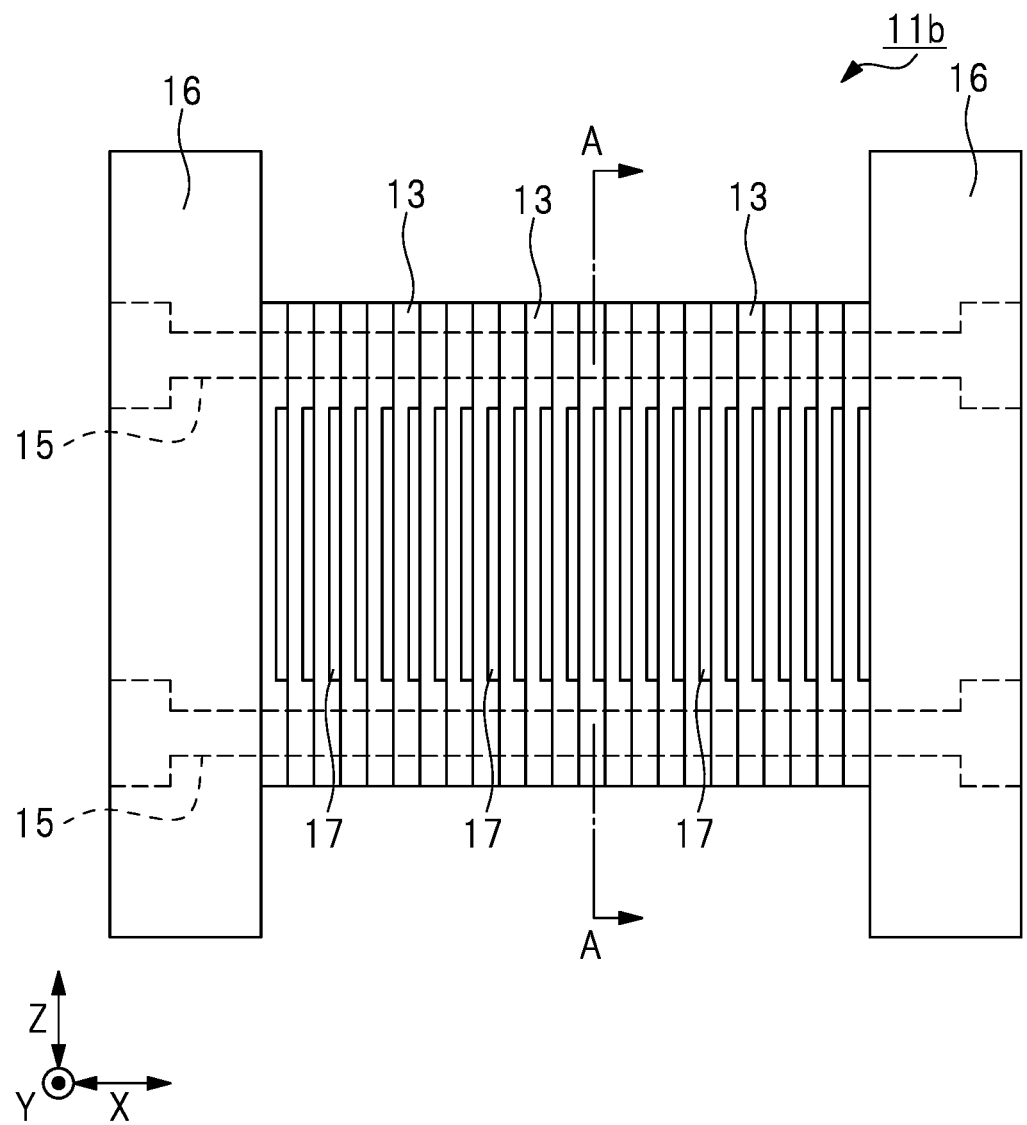
FIG. 3 is a side view showing a dehydration cylinder block of the extruder of one embodiment.
Figure 4:
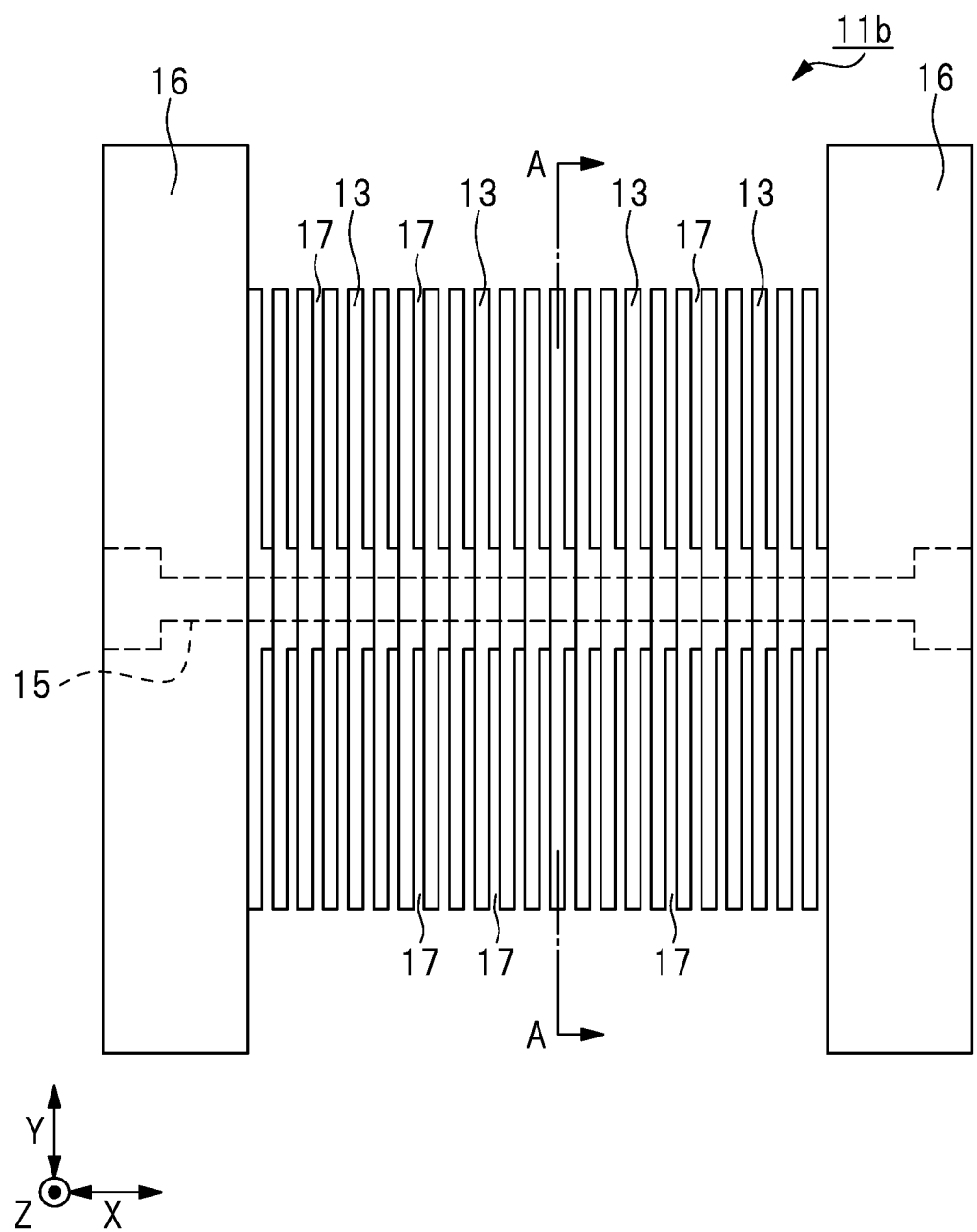
FIG. 4 is a plan view showing a dehydration cylinder block of the extruder of one embodiment.
Figure 5:
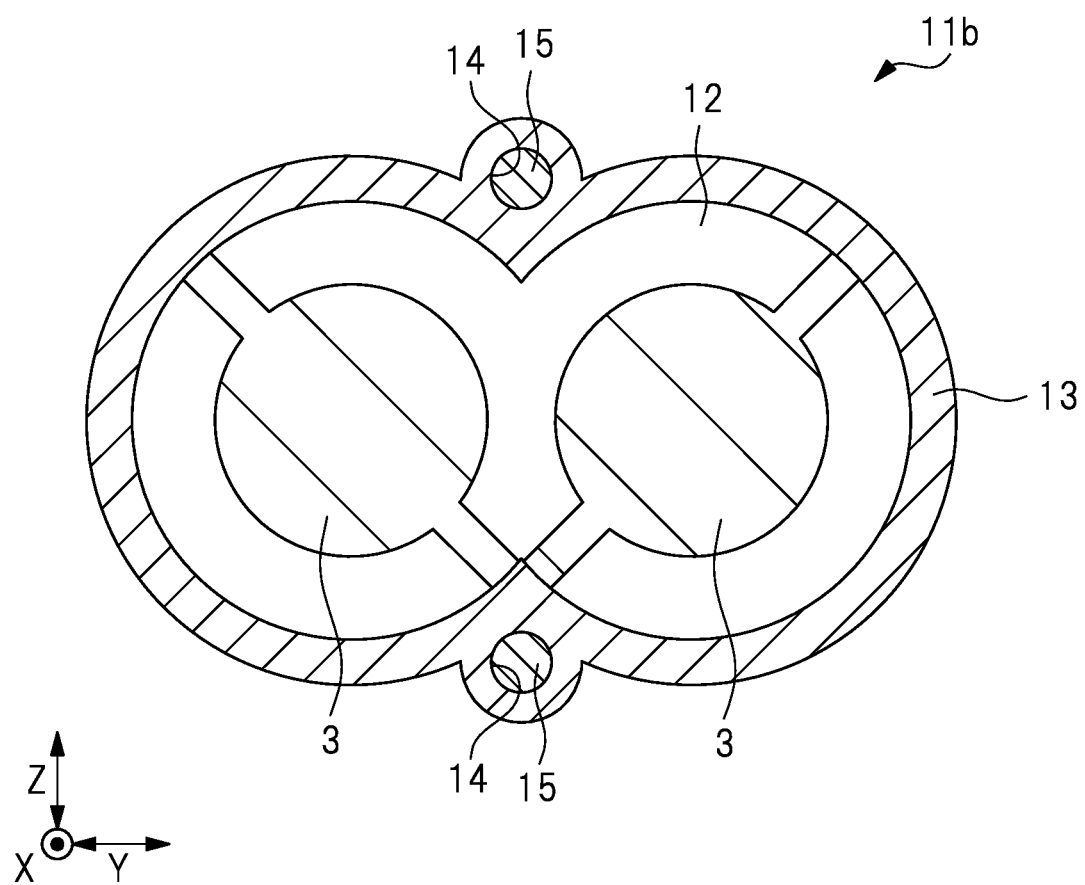
FIG. 5 is a sectional view showing a dehydration cylinder block of the extruder of one embodiment.
Figure 6:
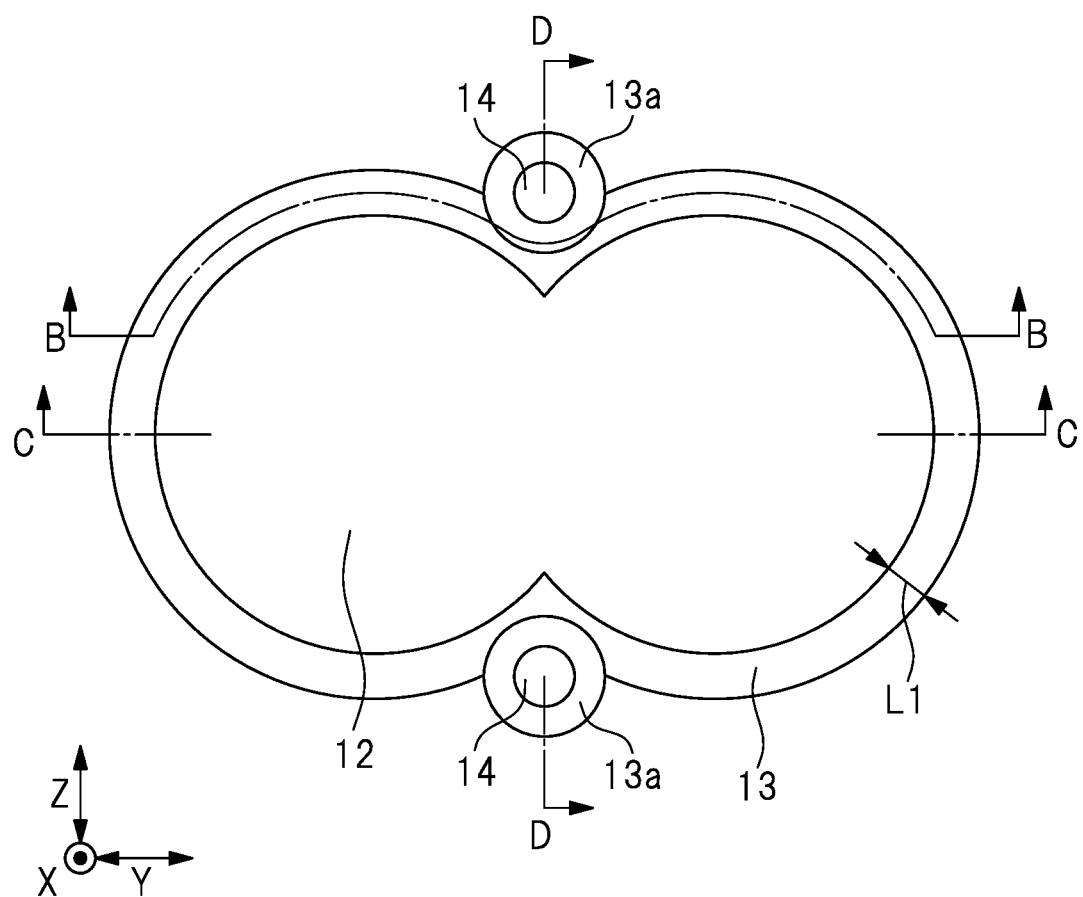
FIG. 6 is a plan view showing a plate-shaped member used in the dehydration cylinder block each shown in FIGS. 3 to 5.
Figure 7:
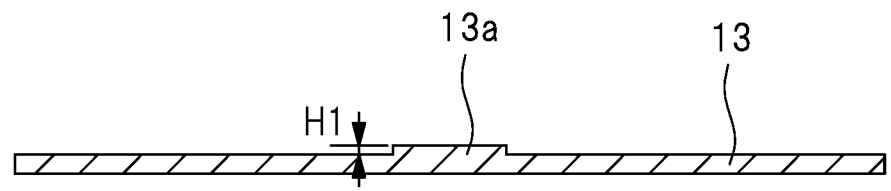
FIG. 7 is a sectional view of the plate-shaped member shown in FIG. 6.
Figure 8:
FIG. 8 is a sectional view of the plate-shaped member shown in FIG. 6.
Figure 9:
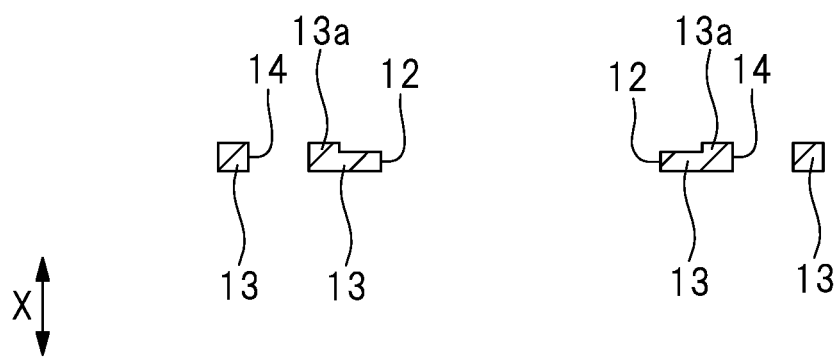
FIG. 9 is a sectional view of the plate-shaped member shown in FIG. 6.
Figure 10:
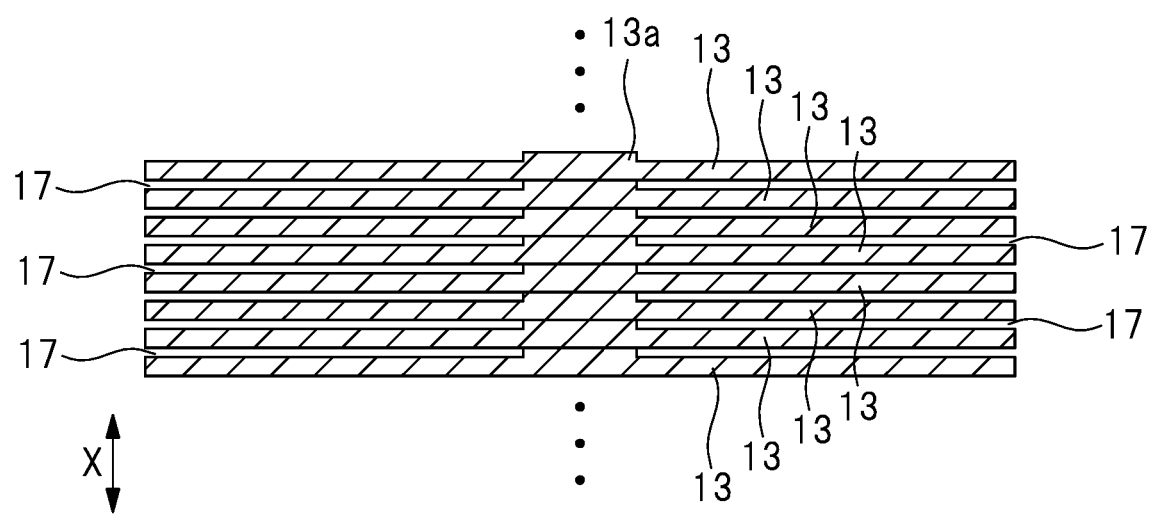
FIG. 10 is a sectional view showing a plurality of plate-shaped members arranged in a long-axis direction of the cylinder.
Figure 11:
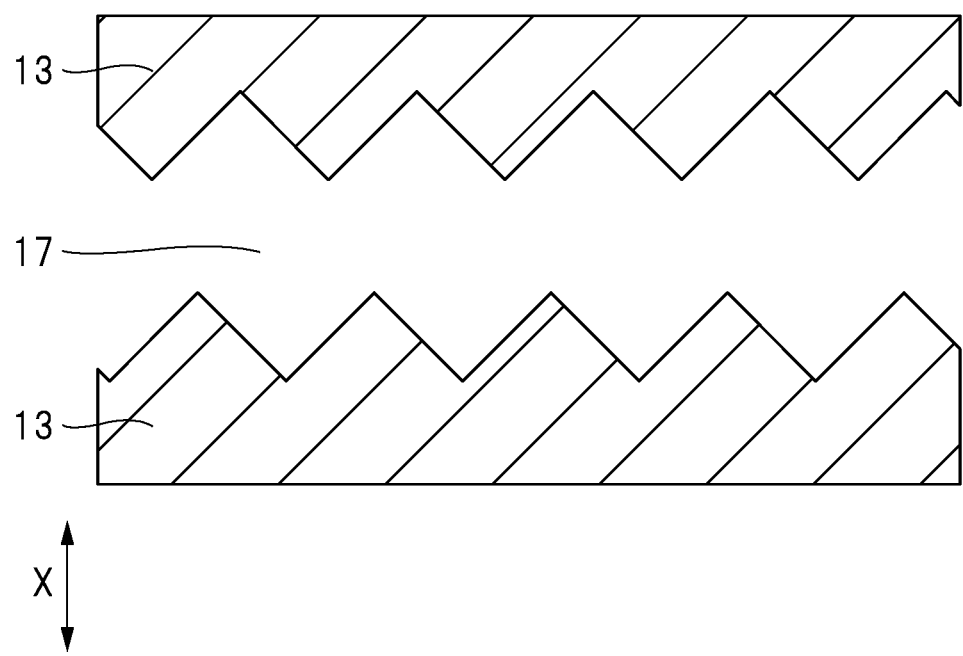
FIG. 11 is a partially enlarged sectional view showing a part of FIG. 10 in an enlarged manner.

FIG. 3 is a side view showing a part of the extruder 2 of the present embodiment, FIG. 4 is a plan view (top view) showing a part of the extruder 2 of the present embodiment, and FIG. 5 is a sectional view of the extruder 2 of the present embodiment. FIGS. 3 and 4 show a side view and a plan view of the dehydration cylinder block 11b, and a sectional view taken at a position of line A-A shown in FIGS. 3 and 4 substantially corresponds to FIG. 5. FIG. 6 is a plan view showing a plate-shaped member 13 used in the dehydration cylinder block 11b, and a plan view when the plate-shaped member 13 is viewed from the X direction is shown. FIGS. 7 to 9 are sectional views each showing the plate-shaped member 13 used in the dehydration cylinder block 11b. A sectional view taken at a position of line B-B shown in FIG. 6 substantially corresponds to FIG. 7, and a sectional view taken at a position of line C-C shown in FIG. 6 substantially corresponds to FIG. 8, and a sectional view taken at position of D-D line shown in FIG. 9 substantially corresponds to FIG. 9. FIG. 10 is a sectional view showing a plurality of plate-shaped members 13 arranged in a long-axis direction of the cylinder 2, and a sectional view corresponding to a cross-section shown in FIG. 7 is shown. FIG. 11 is a partially enlarged sectional view showing a part of FIG. 10 in an enlarged manner.

In the extruder 1 of the present embodiment, a dehydration cylinder block (dehydration cylinder) 11b is provided in the middle of the cylinder 2, and moisture contained in the resin material 7 supplied from the hopper 5 into the cylinder 2 can be discharged outside the cylinder 2 by the dehydration cylinder block 11b.

A structure of the dehydration cylinder block 11b will be described with reference to FIGS. 3 to 11. The dehydration cylinder block 11b has a structure in which a plurality of plate-shaped members 13 each having an opening 12 are arranged in the X direction which is the long-axis direction of the cylinder 2, the screw 3 penetrating through the opening. That is, the dehydration cylinder block 11b has the plurality of plate-shaped members 13 arranged in the long-axis direction (X direction) of the cylinder 2. The plate-shaped member 13 is preferably made of a metal material, for example, stainless steel.

The plate-shaped member 13 has an opening 12 through which the screw 3 passes. Since the plurality of plate-shaped members 13 are arranged in the X direction which is the long-axis direction of the cylinder 2, the openings 12 of the plurality of plate-shaped members 13 communicate with each other in the X direction. That is, the plurality of plate-shaped members 13 are arranged in the X direction so that the openings 12 communicate with each other. By arranging the plurality of plate-shaped members 13 each having the opening 12, a cylindrical cylinder portion (cylinder block 11b) is configured.

The screw 3 passes through a space formed by connecting the openings 12 of the plurality of plate-shaped members 13. For this reason, the plurality of plate-shaped members 13 arranged in the X direction cover an outer periphery of the screw 3. It is preferable that the respective openings 12 of the plurality of plate-shaped members 13 have the same shape (planar shape) and the same dimensions (planar dimensions). Further, it is preferable that the plurality of plate-shaped members 13 have the same shape and the same dimensions as each other.

In cases of FIGS. 5 and 6, it is assumed that the number of screws 3 is two, and the opening 12 has such a shape that two circles are partially overlapped. Further, in the cases of FIGS. 5 and 6, a distance L1 from an outer periphery of the plate-shaped member 13 to the opening 12 is substantially constant. In other words, a planar shape of the plate-shaped member 13 is such a shape that the distance L1 from the outer periphery of the plate-shaped member 13 to the opening 12 is substantially constant. This distance L1 can be set as needed, but can be about, for example, 10 mm. Furthermore, the plate-shaped member 13 is a member whose thickness, a distance between a front surface and a back surface of the plate-shaped member 13, is thin, and a thickness of the plate-shaped member 13 can be preferably about 0.5 to 5 mm and, for example, can be exemplified as about 1 mm. A thickness direction of the plate-shaped member 13 is the X direction. The thickness of the plate-shaped member 13 described here corresponds to a thickness of a region other than a protrusion 13a described later.

A plurality of plate-shaped members 13 arranged in the X direction are fixed to a fixing plate 16 by fixing members 15 such as screws or bolts. Consequently, the plate-shaped member 13 also has an opening 14 for passing through the fixing member 15 such as a screw in addition to the opening 12 for passing through the screw 3. The fixing plate 16 is a metal member that is thicker in thickness and higher in strength than the plate-shaped member 13, and has an opening that communicates with the opening 12 of the plate-shaped member 13. Consequently, the dehydration cylinder block lib has a structure in which the plurality of plate-shaped members 13 arranged in the X direction are sandwiched between a pair of fixing plates 16 separated in the X direction. The fixing plate 16 is preferably made of a metal material, for example, stainless steel.

The screw 3 penetrates, and the resin material conveyed by the rotating screw 3 passes through a space formed by linking the openings 12 of plurality of plate-shaped members 13 in the X direction, that is, a conveyance space of the dehydration cylinder block 11b. Hereinafter, the space formed by connecting the openings 12 of the plurality of plate-shaped members 13 in the X direction will be referred to as a conveyance space of the dehydration cylinder block 11b. A shape and dimensions of a cross-section (cross-section perpendicular to the X direction) of the conveyance space of the dehydration cylinder block 11b substantially correspond to the planar shape and dimensions of the opening 12. Inner walls of the openings 12 of the plurality of plate-shaped members 13 arranged in the X direction constitute an inner wall of the conveyance space of the dehydration cylinder block 11b. Further, in the cylinder block 11 other than the dehydration cylinder block 11b, a space through which the screw 3 penetrates and the resin material conveyed by the rotating screw 3 passes will be referred to as a conveyance space of the cylinder block 11. The conveyance space of the cylinder block 11 on the upstream side of the dehydration cylinder block 11b, the conveyance space of the dehydration cylinder block 11b, and the conveyance space of the cylinder block 11 on the upstream and downstream sides of the dehydration cylinder block 11b communicate with one another in the X direction, and the shapes and dimensions of their cross-sections (cross-sections perpendicular to the X direction) can be substantially the same as one another.

The resin material supplied from the hopper 5 into the cylinder 2 is conveyed on the downstream side in the cylinder 2 by the rotation of the screw 3. At this time, the resin material passes from the conveyance space of the cylinder block 11 on the upstream side of the dehydration cylinder block 11b through the conveyance space of the dehydration cylinder block 11b and is sent to the conveyance space of the cylinder block on the downstream side of the dehydration cylinder block 11b.

In the dehydration cylinder block 11b, the moisture separated from the resin material can be discharged outside from between mutually opposing surfaces of the plurality of plate-shaped members 13. That is, the moisture separated from the resin material conveyed in the cylinder 2 by the rotating screw 3 can be discharged outside through a gap 17 between the mutually opposing surfaces of the plurality of plate-shaped members 13. The gap 17 can function as a slit for discharging the moisture separated from the resin material, and serves as a flow path (discharge path) for the moisture separated from the resin material.

Here, the moisture separated from the resin material can be discharged through the gap 17 between the plurality of plate-shaped members 13, but the resin component(s) contained in the resin material is desirably prevented from being discharged from the gap 17 between the plurality of plate-shaped members 13 as much as possible. That is, in the dehydration cylinder block 11b, it is desirable that the moisture separated from the resin material is selectively discharged from between the mutually opposing surfaces of the plurality of plate-shaped members 13.

The moisture is discharged from the gap 17, but it is effective to increase static pressure of the gap 17 (resistance when a fluid passes through the gap 17) in order to prevent the resin component from being discharged. This is because when the static pressure of the gap 17 is large, in comparison with the moisture and the resin component, the resin component having relatively high viscosity does not invade (penetrate into) the gap 17 and the moisture having low viscosity selectively invades the gap 17.

Thus, in the present embodiment, surface roughness of the mutually opposing surfaces (surfaces opposing the X direction) of the plurality of plate-shaped members 13 arranged in the X direction is roughened (see FIG. 11). That is, the mutually opposing surfaces of the plurality of plate-shaped members 13 are subjected to a roughening treatment. This makes it possible to increase the static pressure of the gap 17.

If the surface roughness of the mutually opposing surfaces of the plurality of plate-shaped members 13 is low, a distance (interval) between the mutually opposing surfaces of the plurality of plate-shaped members 13 is almost the same (constant) regardless of positions in the surface. Meanwhile, when the surface roughness of the mutually opposing surfaces of the plurality of plate-shaped members 13 is roughened (large), a large number of minute irregularities are present on the roughened surface and, by reflecting such a situation, the distance between the mutually opposing surfaces of the plurality of plate-shaped member 13 varies depending on the positions in the surface (see FIG. 11).

Since the surface roughness of the mutually opposing surfaces of the plurality of plate-shaped members 13 is rough (roughened), the gap 17 between the mutually opposing surfaces of the plurality of plate-shaped members 13 is configured so that a cross-sectional area as a flow path of the moisture changes in a complicated manner. Consequently, when the mutually opposing surfaces of the plurality of plate-shaped members 13 are roughened (when the surface roughness is rough), as compared with a case where the surface roughness is not roughened (when the surface roughness is low), the static pressure of the gap 17 which becomes the discharge path of the moisture can be increased. As described above, when the static pressure of the gap 17 is large, in comparison with the moisture and the resin component the resin component having relatively high viscosity does not invade the gap 17 and the moisture having low viscosity selectively invade the gap 17. As a result, the moisture separated from the resin material can be discharged outside from the gap 17, and the resin component contained in the resin material can avoid leaking outside through the gap 17.

The surface roughness of the mutually opposing surfaces of the plurality of plate-shaped members 13 preferably has 1.6a to 25a (1.6a or more and 25a or less) in terms of arithmetic mean roughness Ra. The arithmetic mean roughness Ra can be measured as follows. First, irregularities (unevenness) of a surface in a measurement section (length) to be targeted is measured. Next, an average value of the measured irregularities is set as a reference line, and a difference between the reference line and an irregularity curve is integrated along the measurement section. A value obtained by dividing this integration result by a length of the measurement section is the arithmetic mean roughness Ra.

Further, the mutually opposing surfaces of the plurality of plate-shaped members 13 constituting the dehydration cylinder block 11b is subjected to the roughening treatment, but the inner wall (inner surface) of the cylinder 2 (cylinder block 11) is subjected to no roughening treatment and surface roughness of the inner wall of the cylinder 2 is lower than the surface roughness of the mutually opposing surfaces of the plurality of plate-shaped members 13. This is because the inner wall of the cylinder 2 constitutes the inner wall of the space in which the resin material is conveyed by the rotating screw 3, so that the mutually opposing surfaces, which is subjected to no roughening treatment, are more suitable so as not to adversely affect the conveyance of the resin material. Consequently, in the present embodiment, the surface roughness of the mutually opposing surfaces of the plurality of plate-shaped members 13 constituting the dehydration cylinder block 11b becomes rougher (larger) than the surface roughness of the inner wall of the cylinder 2. Here, the surface roughness of the inner wall of the cylinder 2 corresponds to the surface roughness of the inner wall of the cylinder 2 (cylinder block 11) other than the dehydration cylinder block 11b.

Further, in the plurality of plate-shaped members 13 constituting the dehydration cylinder block 11b, the surface roughness of at least one of both surfaces (two surfaces located on opposite sides to each other) of each plate-shaped member 13 is preferably roughened (large) (i.e., subjected to the roughening treatment), and it is more preferable that the surface roughness of the both surfaces is roughened (subjected to the roughening treatment). Consequently, the surface roughness of at least one of the two surfaces forming the gap 17, more preferably, the surface roughness of the both surfaces becomes roughened, so that the static pressure of the gap 17 is increased to selectively remove the moisture from the gap 17 so that the resin component leaking outside through the gap 17 can be suppressed and prevented.

In addition, in the present embodiment, the gap 17 between the plurality of plate-shaped members 13 arranged in the X direction serves as a flow path of the moisture separated from the resin material. Consequently, a flow-path length when the moisture passes through the gap 17 can be easily adjusted by adjusting the shape and dimensions of the plate-shaped member 13. For example, in the case of FIG. 6, a distance L1 from the outer circumference of the plate-shaped member 13 to the opening 12 becomes a flow-path length when the moisture passes through the gap 17. Consequently, by adjusting the distance L1, controlled can be discharge efficiency when the moisture separated from the resin material is discharged outside through the gap 17. For example, if the distance L1 is too large, the discharge efficiency of the moisture through the gap 17 may decrease. However, by reducing the distance L1 to some extent, for example, by setting the distance to about 20 mm or less, it becomes easier to secure the discharge efficiency of the moisture through the gap 17.

Further, since each of the plurality of plate-shaped members 13 is thin in thickness, each mechanical strength thereof is not so high. However, by arranging the plurality of plate-shaped members 13 in the X direction, the overall mechanical strength of the plurality of plate-shaped members 13 can be enhanced.

Furthermore, in the cases of FIGS. 6 to 9, each of the plurality of plate-shaped members 13 has a protrusion 13a that locally protrudes in the long-axis direction (X direction) of the cylinder. The protrusion 13a can also be regarded, in the plate-shaped member 13, as a portion thinner in thickness than a region other than the protrusion 13a. In the cases of FIGS. 6 to 9, a case where the opening 14 through which the fixing member 15 passes is formed in the protrusion 13a is shown and, in the plate-shaped member 13, a peripheral region of the opening 14 is thicker (larger) in thickness than other regions. The protrusion 13a may be integrally formed with the plate-shaped member 13, or may be formed by joining another member, for example, a film member such as a metal leaf, to the plate-shaped member 13 having a uniform thickness. Moreover, the protrusion 13a can be formed by punching or the like.

The protrusion 13a can define the gap 17 between the plurality of plate-shaped members 13. That is, the dimension (dimension in the X direction) of the gap 17 between the plurality of plate-shaped members 13 can be defined by a protrusion amount H1 of the protrusion 13a. When the protrusion amount H1 of the protrusion 13a is small, the dimension of the gap 17 in the X direction becomes small, and when the protrusion amount H1 of the protrusion 13a is large, the dimension of the gap 17 in the X direction becomes large. The larger the dimension of the gap 17 in the X direction becomes, the higher the discharge efficiency of the moisture through the gap 17 becomes. However, if the dimension of the gap 17 in X direction increases, the resin component may leak outside through the gap 17. Consequently, it is desirable that the dimension of the gap 17 in the X direction is set to an appropriate dimension according to characteristics etc. of a raw material 7 supplied to the cylinder 2.

In the present embodiment, since the gap 17 between the plurality of plate-shaped members 13 can be defined by the protrusion 13a, setting the protrusion amount H1 of the protrusion 13a according to kinds and characteristics, etc. of the resin material supplied to the cylinder 2 makes it possible to adjust the dimension of the gap 17 in the X direction to the optimum dimension. This makes it possible to balance: enhancement of the discharge efficiency when the moisture separated from the resin material is discharged outside from the gap 17; and prevention of the resin component contained in the resin material from leaking outside through the gap 17. The protrusion amount H1 of the protrusion 13a can be, for example, about 0.01 to 1 mm.

Further, even if internal pressure of the cylinder 2 changes, the dimension of the gap 17 between the plurality of plate-shaped members 13 in the X direction hardly changes. Consequently, only the moisture separated from the resin material can be stably discharged from the gap 17 between the plurality of plate-shaped members 13.

Furthermore, the present embodiment may have a configuration of not providing the protrusion 13a, that is, of setting the protrusion amount H1 of the protrusion 13a to zero. Even when the protrusion 13a is not provided, the surface roughness of the mutually opposing surfaces of the plurality of plate-shaped members 13 is roughened, so that a large number of minute irregularities are present on the surfaces of the plate-shaped members 13, which makes it possible to secure the flow path of the moisture between the mutually opposing surfaces of the plurality of plate-shaped members 13. Thus, even if the protrusion 13a is not provided, the moisture separated from the resin material can be discharged outside through the gap 17.

Figure 12:
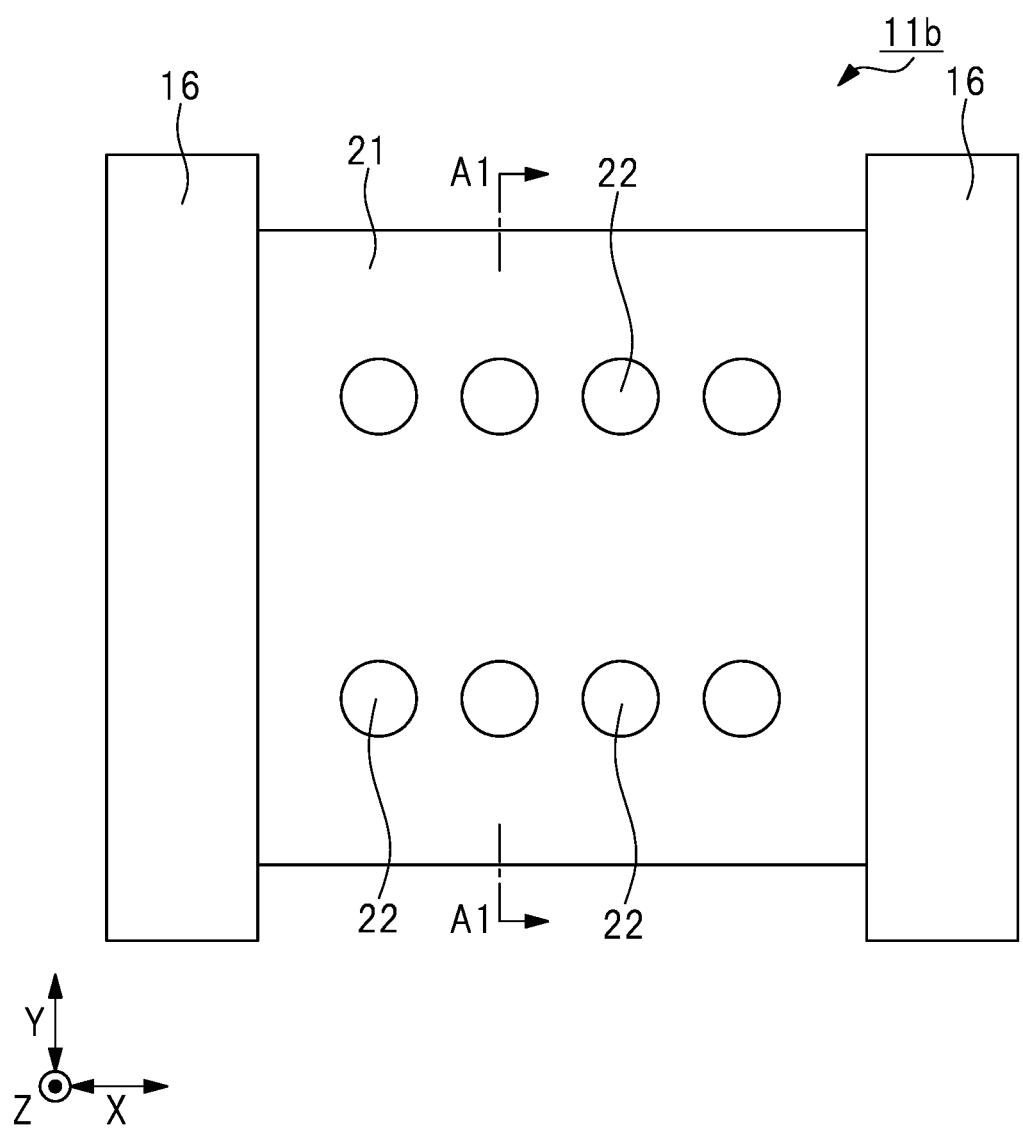
FIG. 12 is a plan view showing a modification example of a dehydration cylinder block.
Figure 13:
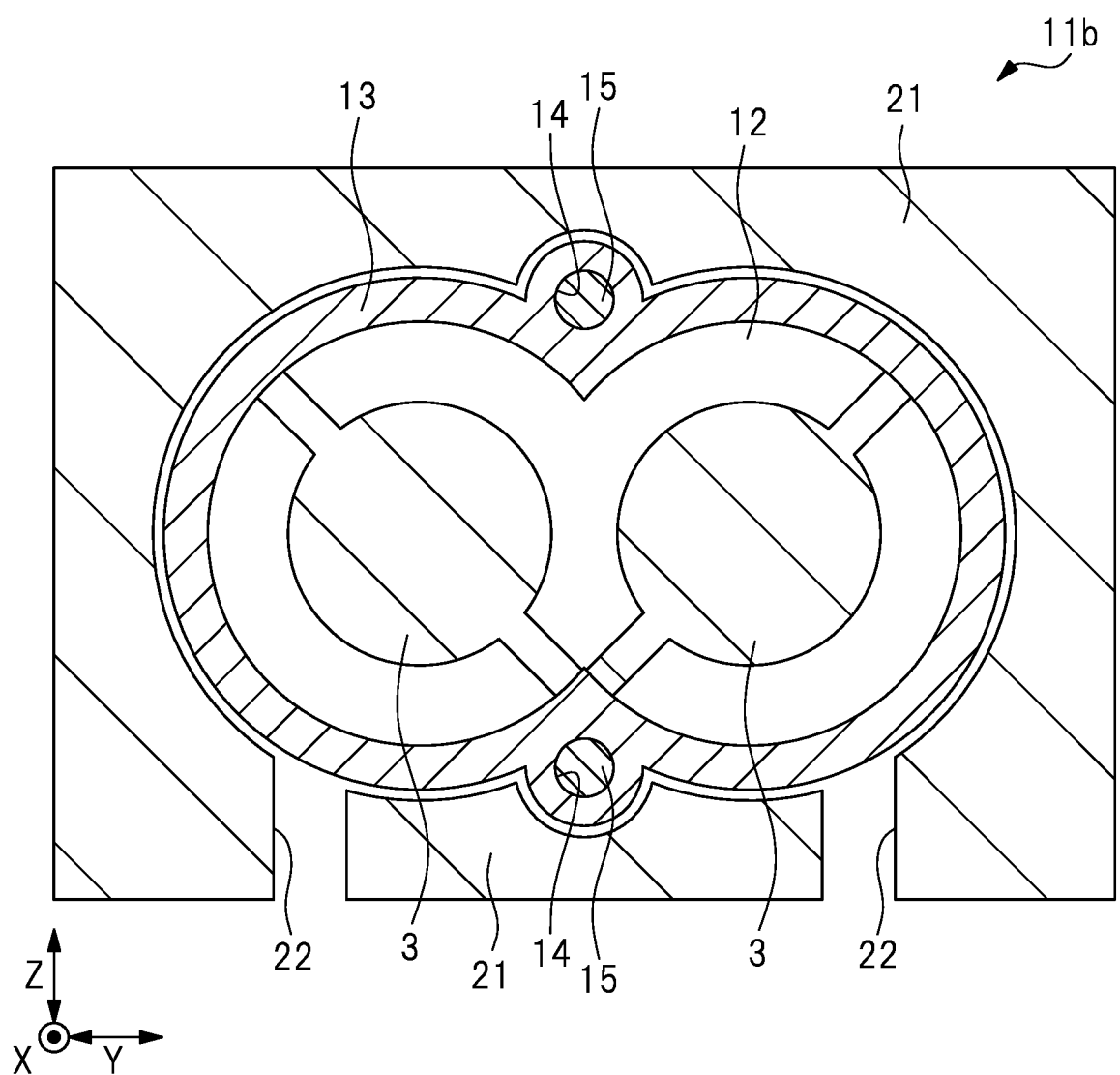
FIG. 13 is a sectional view showing a modification example of a dehydration cylinder block.

FIGS. 12 and 13 are a plan view (FIG. 12) and a sectional view (FIG. 13) each showing a modification example of the dehydration cylinder block 11b. FIG. 12 is a bottom view, FIG. 13 shows a cross-section corresponding to FIG. 5, and a section view taken at a position of line A1-A1 shown in FIG. 12 substantially corresponds to FIG. 13.

In cases of FIGS. 12 and 13, the plurality of plate-shaped members 13 arranged in the X direction are covered with a metal cover member (metal member, metal block) 21. Covering the plurality of plate-shaped members 13 arranged in the X direction with the metal cover member 21 makes it possible to protect the plate-shaped members 13. The cover member 21 covers the outer periphery of the plurality of plate-shaped members 13 arranged in the X direction, but has an opening 22 for discharging moisture. Consequently, the moisture discharged from the gap 17 between the plurality of plate-shaped members 13 can be discharged outside through the opening 22 of the cover member 21.

Although the invention made by the present inventor(s) has been specifically described above based on the embodiments thereof, the present invention is not limited to the above-mentioned embodiments and, needless to say, can be variously modified without departing from the scope thereof.

What is claimed is:

1. An extruder comprising:
    a cylinder;
    a supplying unit supplying a resin material containing moisture into the cylinder;
    a screw built in the cylinder and conveying the resin material supplied to the cylinder; and
    a dehydration cylinder portion provided in middle of the cylinder and discharging the moisture separated from the resin material,
    wherein the dehydration cylinder portion has a structure in which a plurality of plate-shaped members, each having an opening, are arranged in a long-axis direction of the cylinder, the screw passing through the opening;
    an outer periphery of the plurality of plate-shaped members is covered by a cover member, the cover member including a plurality of openings for discharging the moisture from the dehydration cylinder portion;
    surface roughness of mutually opposing surfaces of the plurality of plate-shaped members is rougher than surface roughness of an inner wall of the cylinder;
    the surface roughness of the mutually opposing surfaces of the plurality of plate-shaped members is 1.6a to 25a in terms of arithmetic mean roughness Ra;
    a distance between the outer periphery of each of the plate-shaped members and corresponding openings in the plate-shaped members is 10 mm to 20 mm; and
    a distance between a front surface and a back surface of each plate-shaped member along the long-axis direction is 0.5 mm to 5 mm.

2. The extruder according to claim 1,
    wherein the moisture separated from the resin material is discharged from between the mutually opposing surfaces of the plurality of plate-shaped members.

3. The extruder according to claim 1,
    wherein each of the plurality of plate-shaped members has a protrusion that protrudes in the long-axis direction of the cylinder, and
    a gap between the plurality of plate-shaped members is defined by the protrusion.

4. The extruder according to claim 1, comprising two screws built in the cylinder so as to mesh with each other and so as to convey the resin material supplied to the cylinder,
    the opening in each of the plate-shaped members having a shape of two partially overlapping circles through which corresponding screws pass.

* * * * *